Oct. 18, 1949.                W. C. KEEBLER                  2,485,052
                                TOOLHOLDER
Filed June 19, 1947                                      3 Sheets-Sheet 1
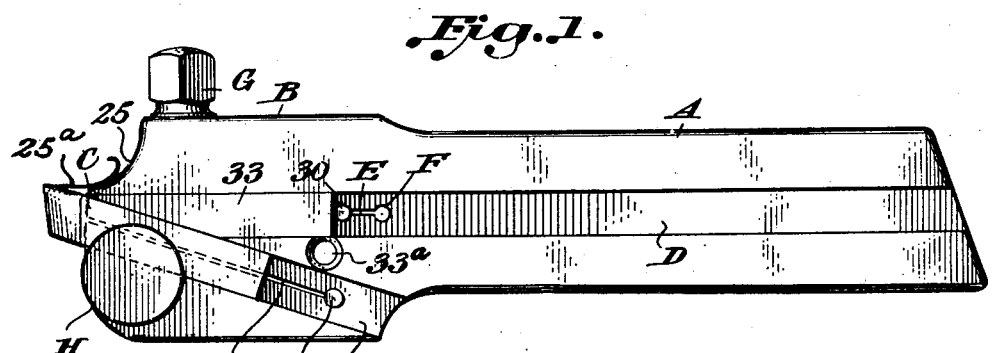
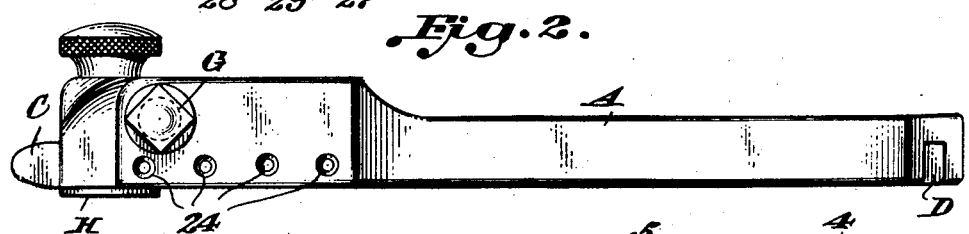
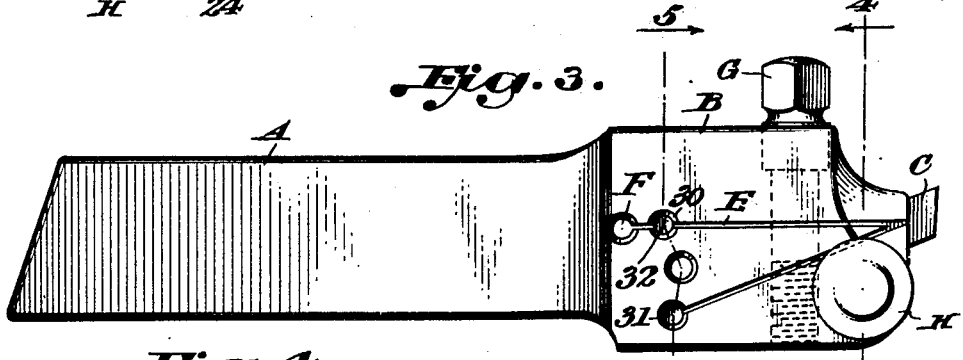
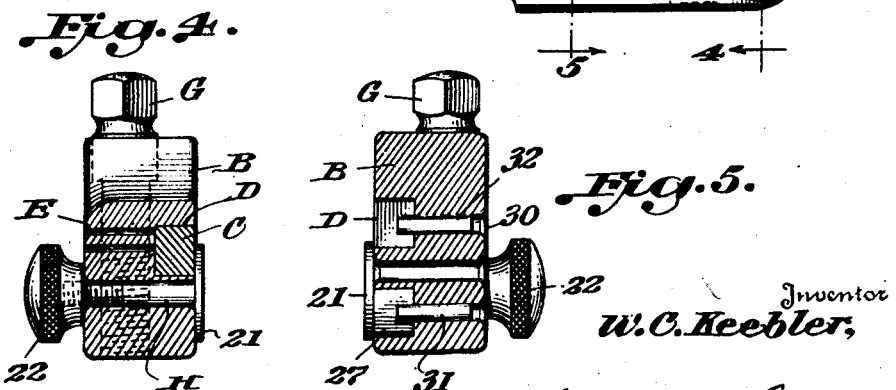
Inventor
W. C. Keebler,
By Harold C. Thorne
                Attorney Oct. 18, 1949.  W. C. KEEBLER  2,485,052
TOOLHOLDER
Filed June 19, 1947  3 Sheets-Sheet 2
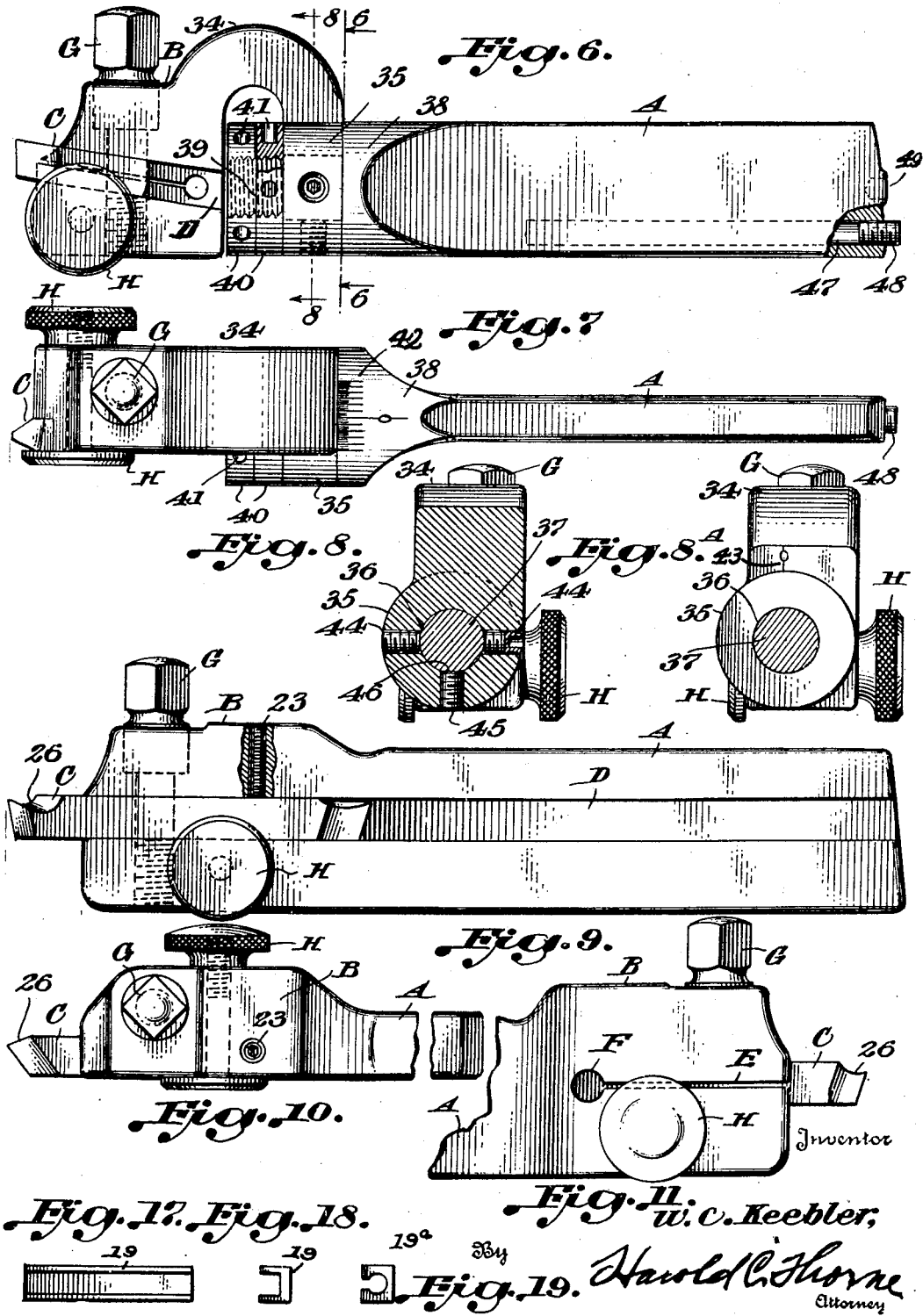
Inventor
W. C. Keebler,
By Harold C. Horne
Attorney Oct. 18, 1949.  W. C. KEEBLER  2,485,052
TOOLHOLDER
Filed June 19, 1947  3 Sheets-Sheet 3
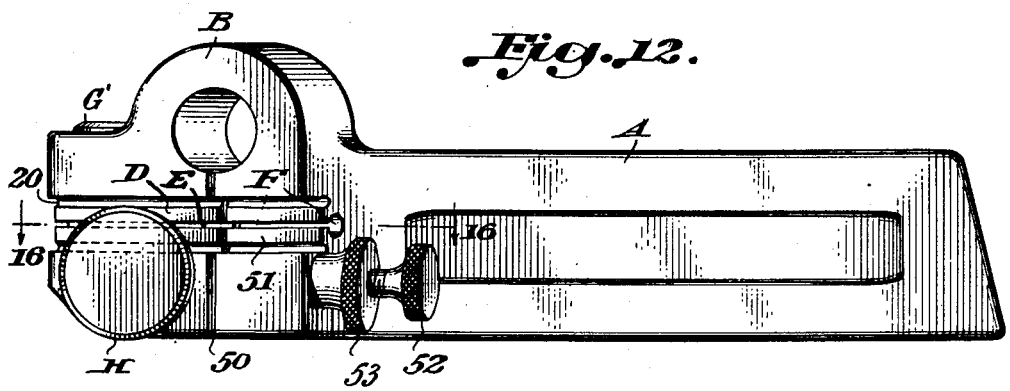
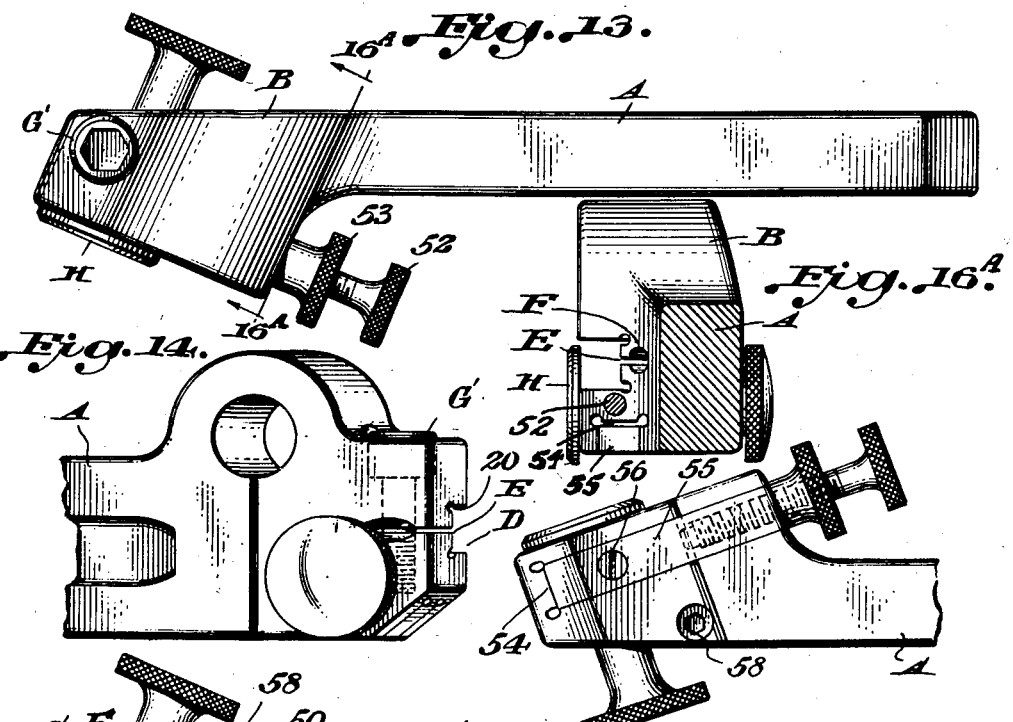
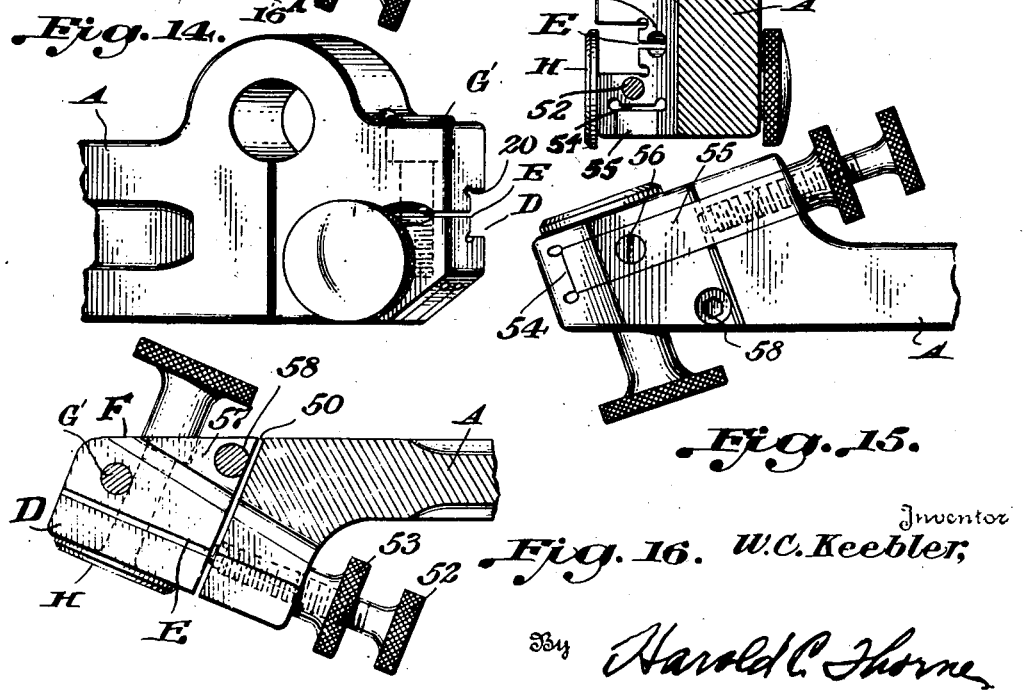
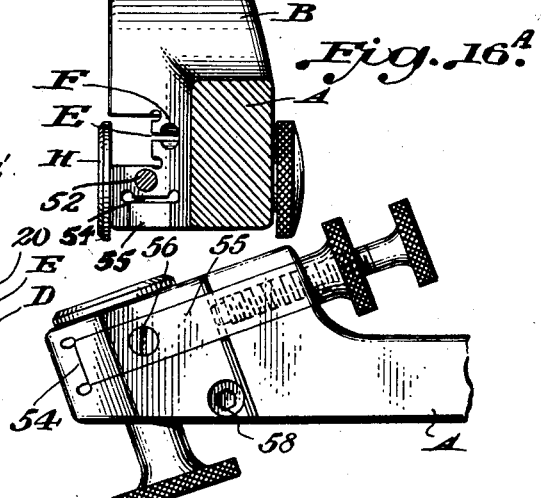
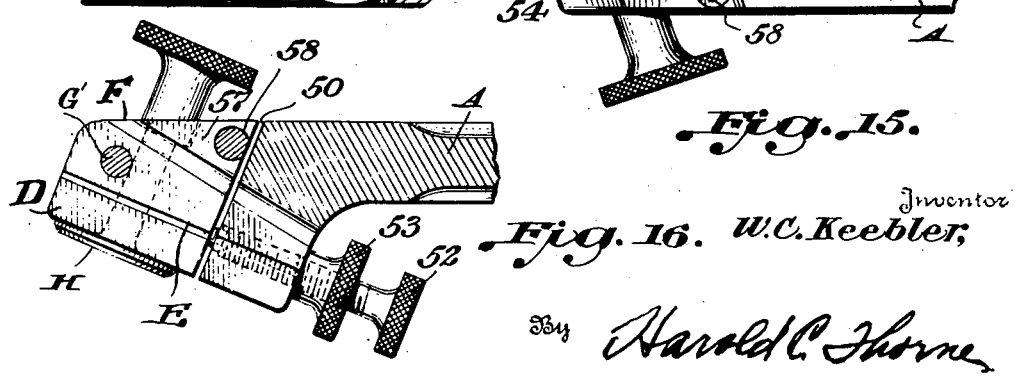
Inventor
W. C. Keebler,
By Harold C. Thorne
Attorney Patented Oct. 18, 1949

2,485,052

UNITED STATES PATENT OFFICE 2,485,052

TOOLHOLDER

William C. Keebler, Washington, D. C.

Application June 19, 1947, Serial No. 755,769

17 Claims. (Cl. 29—97.5)

This invention relates to improvements in tool holders, of the type employed in turning lathes and the like wherein the tool holder is clamped in a tool rest or other form of support depending upon the operations to be performed and more particularly to the manner of gripping the bit and other improvements as will be pointed out.

My invention is illustrated herein as applied to tool holders for various types of work particularly turning, boring, thread chasing and other operations. While the tool holders in accordance with my invention are preferably made of high grade steel, hardened and ground for the highest degree of precision work, it will be understood that they may be drop forged and still have a high degree of precision together with the advantages of the particular construction for improved cutting operations.

While I am aware that there are many types of tool holders patented and on the market, it is the principal object of my invention to provide an improved tool holder or other holder for cutting bits with simple and effective means for clamping the tool bit so firmly and solidly that it is substantially an integral part of the holder so that the hardness of the tool bit can be increased to the highest degree and the clamping effect of the holder will not break the tool bit.

Another object of my invention is to provide a tool holder made of a high grade steel of sufficient hardness that it will not burr or scratch, tough so it will not break but will permit the formation of a channel the length of the tool holder for the reception of a long or a short tool bit, even longer than the tool holder if desired, thereby effecting a saving of tool steel.

Another object is to provide such a tool holder with clamping means adjacent to the front end of the tool holder whereby tool bits of any length, long or short, may be solidly gripped in the tool holder immediately adjacent to the cutting edge of the bit. Specifically such a tool holder and gripping means include an extended side channel for engaging long and short tool bits with a kerf or slot bifurcating the forward end of the tool holder head, with a cap screw for drawing the parts into gripping engagement with the bit and further the provision of one or more supplemental set screws through one of the bifurcated parts of the tool holder for engaging the bit in the channel in a position beyond the cap screw and thus cooperate therewith for maintaining the bit in place.

Another object of the invention is to provide such a tool holder with a crosswise bolting element for engaging the side of the tool bit in the channel and thereby maintain the bit throughout its forwardly extending length in engagement with the back wall of the channel so that it will always extend in direct or parallel alignment with the axis of the tool holder head.

Another object of the invention is to provide such a tool holder with an additional channel diverging downwardly from the end of the longitudinal channel so that a tool bit may be selectively positioned in either channel and in such arrangement to provide kerfs or slots in conjunction with each channel so that the parts of the tool holder for this angularly inclined channel may be similarly clamped by the same cap screw.

Another object of the invention is to provide in such a tool holder having the two diverging channels as set forth, a wedge block adapted to be positioned in either of the channels and laterally movable stops in the tool holder for engaging the wedge block and maintain it in engagement with the bit in the other channel.

Another object of the invention is to provide a tool holder of the character set forth with a chip-breaking surface at its forward end which cooperates with a bit held in the holder for breaking the chips and thus save material of the bit obviating the necessity of forming the bit with an upper chip-breaking ground lip.

Another object of the invention is to provide such improved bit clamping means in spring tool holders for thread chasing operations.

Another object of the invention is to provide in such a spring tool holder a guide bar to prevent lateral movement of the tool support with respect to the shank of the tool holder.

Another object is to provide such a spring tool holder with an adjustable stop for limiting the spring action in the holder.

Another object is to provide such a spring tool holder with a helical angle swivel head.

Another object of the invention is to provide a bushing adapter member preferably of channel formation for engaging the channel in tool holder for cooperating with the bit gripping elements of the tool holder and a smaller bit inserted in the channel member so that such smaller bit may be held in the tool holder with the same efficiency as the larger bits.

A particularly important feature of the invention is that the bit receiving channel is formed in true alignment parallel with the axis of the tool holder so that angular bits may be precision ground and when inserted in the tool holder the correct cutting operations may be relied upon.

This is particularly important in thread-cutting operations requiring the cutting of accurate threads.

Further objects, advantages and details of my invention will appear in the following specification wherein highly satisfactory forms of tool holders in accordance with my invention are described in detail, which forms are illustrated in the accompanying drawings forming a part of this specification.

In the drawings:

Figure 1 is a front side view of a tool holder embodying features of my invention.

Figure 2 is a plan view thereof.

Figure 3 is a reverse side view thereof.

Figure 4 is a vertical sectional view taken on line 4—4 of Figure 3.

Figure 5 is a vertical sectional view taken on line 5—5 of Figure 3.

Figure 6 is a front side view of a helical angle swivel thread chasing spring tool holder in accordance with my invention.

Figure 7 is a plan view thereof.

Figure 8 is a vertical sectional view taken on line 8—8 of Figure 6.

Figure 8A is a vertical sectional view taken on line 6—6 of Figure 6.

Figure 9 is a front side view of a simple form of tool holder embodying features of my invention.

Figure 10 is a fragmentary plan view thereof.

Figure 11 is a reverse side view thereof.

Figure 12 is a front view of a spring tool holder with an adjustable stop and other features in accordance with my invention.

Figure 13 is a top plan view thereof.

Figure 14 is a fragmentary reverse side view thereof.

Figure 15 is a fragmentary bottom plan view thereof.

Figure 16 is a horizontal sectional view thereof taken on line 16—16 of Fig. 12.

Figure 16a is a vertical sectional view thereof taken on line 16A—16A of Figure 13.

Figure 17 is a side elevation view of a channel adapter element for smaller sized tool bits for the tool holder.

Figure 18 is an end elevation thereof, and

Figure 19 is an end elevation of a modified form thereof.

In general my invention is illustrated as applied to several types of tool holders each including a longitudinal shank A adapted to be supported and gripped in a conventional type of tool rest in a lathe or other form of tool support in turning or cutting machinery. The forward end of these shank members terminates in a head B from which the cutting ends of bits C extend—in turning and boring tool holders illustrated in Figures 1 to 5 and Figures 9, 10 and 11 the head is in direct alignment with the shank and in the thread chasing tool holders shown in Figures 12 to 16 they extend angularly with respect to their shanks and the shanks and heads are co-extensive and integral parts except the helical angle swivel thread chasing spring tool holder shown in Figures 6 to 8. For operations requiring the utmost precision the tool holders are made of a high grade steel which after fabrication is hardened and ground rather than by drop forging processes as will be apparent in view of their construction as will be described in detail.

Each of the tool holders includes a longitudinal substantially square channel D milled to snugly receive the tool bit C in a side of the heads thereof in the angularly disposed and spring tool holders and throughout the length of the tool holders for turning and boring operations. A highly important feature in common with all these tool holders but only particularly illustrated in the spring tool holder, Figures 12 to 16 inclusive, is that the channels D are milled to provide a rounded depression 20 in each of the corners thus obviating any danger of a projection which would engage the corners of the tool bits and prevent their back surfaces from engaging upright surfaces at the back of the channels. Thus the tool receiving channels D provide for the reception and snug engagement of standard sizes of square cross-section bits C whether or not the surfaces are ground and polished to size, though preferably they are, and the depth of the channel is very slightly less than the width of these bits.

In the case of relatively large size tool holders (some of which are illustrated in the drawings on a reduced scale) a channel adapter 19 illustrated in Figures 17 and 18 may replace the standard size bits for the reception of smaller bits for cutting, turning, boring or thread chasing operations. Such an adapter permits of the use of small bits for internal boring, thread chasing and the like in small internal diameters as well as other types of work as will be apparent. The adapter 19 fits in channel D the same as bit C and receives smaller size bits in a similar manner, and the adapter and bit therein are held in the tool holder the same as bit C. Such adapters, for example a half-inch square may be channeled to receive ⅜", ¼" or even smaller sized bits and in Fig. 19 an adapter 19a is shown for receiving round shanked bits in the same manner.

For gripping the cutting bits in the tool holder channels D the head B of each of the tool holders is provided with a kerf or slot E preferably terminating in a drilled hole or bore F extending longitudinally of the channel except in the spring tool holder shown in Figures 12 to 16 where it extends laterally from the back wall of the channel—thus in each instance providing bifurcated upper and lower parts of the head above and below the bit holding channels. A cap screw G extends through a bore in the upper bifurcated part of the head and engages a threaded bore in the lower part whereby they may be drawn together to grip the upper and lower surfaces of the tool bit C. A modified form of cap screw G' is shown in Figures 12 to 16 which may be preferable when it is not desirable to use a cap screw with a projecting head.

To insure that the bits C are positioned and held in engagement with the wall at the back of channels D so as to be in proper alignment in the tool holders, the heads B of the tool holders are each shown with a laterally extending bolt H through them adjacent to their front ends. These bolts are provided with enlarged preferably round heads 21 with flat inner surfaces for engaging the outer side of the tool bits C and knurled thumb screws 22 are threaded on the shanks of the bolts on the back side of the tool holder heads so that the bit C may be drawn into tight lateral engagement in the channels D.

In turning and boring tool holders as shown in Figures 1 to 5 and 9 to 11, additional bit gripping means are provided. In the simple smaller type of turning tool holder shown in Figs. 9 to 11 a single set screw 23 is threaded through the upper part of head B into channel D so as to engage bit C at a distance to the rear of the clamping cap screw G, the two thus cooperate with each other to solidly hold the bit in its operative position. In the larger tool holder shown on a reduced scale for illustrative purposes in Figs. 1 to 5 a series of such set screws 24 are provided for gripping the bit in channel D both forwardly and rearwardly of the clamping cap screws G along the channel in the head portion of the tool holder. It is pointed out that while cap screws G operate to draw the forward bifurcated parts of the head B into clamping position upon the turning or boring bit C which is adequate to grip bits for normal operations, for heavy duty the set screws 23 and 24 provide for a more effective gripping of the bit longitudinally thereof. These set screws have a bearing engagement on the upper surface of the inwardly extending portion of the bit with the stresses on the upper portion of the tool holder head by the cap screws G and set screws 23 and 24 in opposition to each other insofar as the tool holder head is concerned but effect a solid grip on the cutting bit carried by the tool holder.

Thus the bits are gripped in the tool holder so as in effect to be integral parts thereof. Due to the character of the work generally done with the spring type of tool holders such additional set screws bit gripping elements are not essential although they may be constructed with them if desired.

As set forth the tool holders illustrated in Figures 1 to 5 and Figures 9 to 11 are made for relatively heavy cutting operations, particularly turning and boring and as a further feature of the invention it will be noted that the upper forward portion of the head B in Figures 1, 2 and 3 is curved downwardly and outwardly as indicated at 25 to provide a chip breaker which particularly adapts the holder for use with a cutting bit without the ground lip chip breaker 26 shown in conjunction with the bit C in Figures 9, 10 and 11.

This is applicable with both straight or inclined bits, as illustrated in Fig. 1 with bit C inclined and its cutting edge just slightly beyond the end of the tool holder a clip 25a being formed in a cutting operation, it engages the curved surface 25 on the tool head which serves as a lip for the cutting bit and in place of such a lip or chip breaker formed in the bit itself. Thus the chip breaker 25 on the tool holder head obviates the necessity for such a ground lip on the bit results in a substantial saving of bit tool steel material.

The tool holder in its simplified form illustrated in Figures 9 to 11 has been fully described with respect to the basic features of the invention. The bit C is shown with two forms of cutting blades, one at each end, and obviously other forms of bit cutting blades may be employed in the channel D especially of the turning or boring types though it is within the scope of my invention to provide a tool holder having a modified shape of channel D for cutting off tools and the like.

In the tool holder shown in Figs. 1 to 5, the holder is supplemented with an upwardly inclined channel 27 in which the tool C is inserted instead of in channel D, in either of which channels the bit may be selectively inserted. These two channels provide a means for arranging the bit for disposal in a horizontal position or at an inclined angle so that the angle of cutting may be changed to suit the character of work or material upon which the cutting is to be performed. In this tool holder the channel 27 is provided with a kerf or slot 28 terminating in a drilled or bore hole 29 similar to kerf E and bore hole F; these holes not only provide a terminus for the kerfs but increase the flexibility of the bifurcated portions of the head elements.

In this arrangement an additional hole 30 is provided through the head in line with kerf E in the same relative position in channel D as bore hole 29 in channel 27 and slidable stop pins 31 and 32 are positioned in these holes. These pins provide stops for a wedge block 33 which is interchangeably positioned in either channel D or 27, for providing a backing for bit C when it is positioned in one or the other of the channels. As shown in Figure 5 pins 31 and 32 are partially projected into the channels, in which positions they function as stops and from which positions they may be slidingly retracted to free either or both of the channels for bits of any desired length. When cap screw G is turned to clamp the tool bit in place these stops are also gripped and held against movement.

The lateral bit engaging bolt H is shown in a forward position for engaging the side of bit C in the inclined channel 27. For an alternative position the head B is provided with a hole 33a in which this bolt may be positioned for engaging a bit in either of the channels.

In the arrangement shown in Figs. 6 to 8 the tool holder head B is swivelly connected to the shank A by an arched portion 34 extending from the back portion of head B and terminating in a circular enlarged portion 35 having an axial bore 36 therethrough providing a longitudinal axial bearing in which it is engaged by a cooperating journal member 37 extending axially from the forward cylindrical end 38 of shank A.

The outer end 39 of journal member 37 is threaded to receive a pair of lock nuts 40 having apertures 41 in their peripheries for operating them with a rod or suitable wrench for locking the swivel head in the desired angular position with respect to the axis of shank A in accordance with the operation to be performed with the cutting bit C.

As shown, bit C is provided with a 60° angle inclusive cutting edge for thread chasing and the channel D is inclined so as to hold the bit at a favorable angle as desired for the operations to be carried out with the tool, a smaller inclination than channel 27 of the tool holder shown in Fig. 1, though in the operations on some metals it may be desired to have the channel horizontal in this form of helical angle swivel thread chasing spring tool holder instead of an angle as shown.

In order to adjust and maintain the head B at the required angle with respect to the shank A, as shown in Figs. 7 and 8A the cylindrical portion 38 of shank A is provided with graduations 42 and the back of head B has an index 43 for cooperation with the graduations so that the head may be set with precision to the predetermined angle desired.

In addition to lock nuts 40 for holding the head in position, the head has a pair of lateral set screws 44, as shown in Figure 8 one in each side of the bearing portion 36 for positively holding the head at desired angular position. A third set screw 45 is arranged vertically in the under side of bearing 36 and is adapted to engage a flat 46 on the under portion of journal 37 to grip the same and hold the head in a normal upright position with the index 43 on the head at the zero position of graduations 42 on the cylindrical portion 38 of shank A.

In this tool-holder shank A is provided with a longitudinal bore 47 providing a receptacle for tools or rod members to be used with the tool holder and work and a set screw 48 provides a closure therefor. The rear end of shank A has a centering drill hole 49 therein in the axial center of the shank A of the tool holder, likewise the front end (not shown), which are employed in the fabrication of the tool and these may or may not be left after the completion of the tool.

Referring to Figures 12 to 16, this spring tool differs from the other forms of holders in that the head B is arranged with the bit channel D at a horizontal angle with respect to the axis of the handle. The head is an arched type having a slot or kerf 50 to provide for movement of the bit holding portions of the head and the rear portion 51 of channel D, into which the rear portion of the bit C may project is slightly larger than the front bit gripping portion so that if the bit should extend into this rear portion movement will be permitted so as not to impair the spring action of the holder.

An important feature of this spring tool holder is an adjusting screw 52. See particularly Fig. 16 wherein the forward end of the screw is in engagement with the front bit holding portion of the head where it is first positioned in making an adjustment of the spring action. After so positioning screw 52 it is backed away therefrom, in accordance with the operations to be performed and a locking nut 53 is turned to tighten the adjusting screw 53 from turning. This is important in operating on light work though for heavy work where the full spring action is desired the adjusting screw 52 may be backed away so as not to contact the front bit carrying head portion at all. The degree of adjustment of screw 53 is dependent on the character of the work and may be varied in accordance with conditions to provide a smooth operation of the cutter on the work.

In order to prevent lateral movement of the bit supporting front portion of the head the under portions of both front and rear portions of the head are provided with a longitudinal channel 54 parallel with channel D as shown in Fig. 15, the rear portion of channel 54 extends upward in that portion of the head above the top of the channel in the front portion. In this channel a guide bar 55 is secured by means of a screw 56. It will be seen that this bar prevents any lateral movement of the front portion of head B with respect to the rear portion thereof but does not interfere with the spring action.

Referring again to Fig. 16 it will be observed that the kerfs F and 50 sever the lower front portion of head B except for the small portion 57 at the back side thereof. During the construction of the tool holder as well as while in operation it is necessary that this portion should be reinforced. Therefore, an upwardly extending threaded bore hole is provided with a set screw 58 of tough metal inserted which maintains the parts in place without danger of breakage. Even if this lower front portion of the head should break or the holder were constructed with this portion as a separate element as may be desired, this set screw 58 will hold the head portion in position and together with cap screw G' a cutting bit C may be securely held in position in the tool holder.

Reference is made to my earlier application for Lathe tool bit holder, Serial No. 618,081, filed September 24, 1945, which application has been abandoned in favor of the present application which incorporates the subject matter of invention thereof.

I do not wish to limit myself to any of the specific constructions or modes of operation described and referred to above in this specification for purposes of giving examples or illustrations of employment of the invention for it is obvious that departure from the above may be made without departing from the spirit and scope of my invention, which is set forth in the following claims.

I claim:

1. A tool holder including a longitudinal shank to be held in a tool post or the like, said shank having a head portion at its forward end with a longitudinal bit holding channel in one side thereof and having a kerf extending longitudinally of the bit holding channel permitting the parts separated by the kerf to be clamped on a bit placed in the channel, a cap screw for clamping the same upon the bit, and one or more set screws extending vertically through the upper portion of the head into the channel for engaging the upper surface of the bit and cooperating with said cap screw for gripping the bit.

2. A tool holder including a longitudinal shank to be held in a lathe tool post or the like with a head portion from which a cutting bit is arranged to project, said head having a longitudinal bit holding channel in one side thereof including upper and lower laterally extending walls and a vertical back wall for engagement with upper and lower walls and a vertical wall respectively of a tool bit, the head having an inwardly projecting kerf along the vertical back wall of the channel permitting the parts defined by the kerf to be clamped on a bit placed in the channel, a cap screw for clamping said parts upon the bit, one portion of the head adjacent to said kerf having a lateral bore therethrough, and a screw extending through said lateral bore having a head on the channeled side for engaging a vertical side of the bit in the channel for holding the same in engagement with the vertical back wall of the channel.

3. A tool holder including a longitudinal shank to be held in a lathe tool post or the like with a head portion from which a cutting bit is arranged to project, said head having a longitudinal bit holding channel in one side thereof and extending throughout the length of the shank, and a second channel inclined downwardly from the outer end of the first channel, each of said channels including upper and lower laterally extending walls and a vertical back wall for engagement with upper and lower walls and a vertical wall respectively of a tool bit, the head having inwardly projecting kerfs along the back walls of both channels permitting the parts defined by the kerfs to be clamped on a bit placed in either channel, a cap screw extending vertically through the parts of the head for clamping them upon the bit in either channel, one portion of head adjacent to said channels having a lateral bore therethrough, and a screw extending through said lateral bore having a head on the channeled side for engaging the outer vertical side of the bit in either channel for holding the same in engagement with the vertical back wall of the selected channel.

4. A tool holder including a longitudinal shank to be held in a lathe tool post or the like with a head portion from which a cutting bit is arranged to project, said head having a longitudinal bit holding channel in one side thereof and extending throughout the length of the shank, and a second channel inclined downwardly from the outer end of the first channel, each of said channels including the head having inwardly projecting kerfs along the back walls of both channels permitting the parts defined by the kerfs to be clamped on a bit placed in either channel, a cap screw extending vertically through parts of the head for clamping upon the bit in either channel, and one or more set screws extending vertically through the upper portion of the head into the channel for engaging the upper surface of the bit and cooperating with said cap screw for gripping the bit.

5. A tool holder including a longitudinal shank to be held in a lathe tool post or the like with a head portion from which a cutting bit is arranged to project, said head having a longitudinal bit holding channel in one side thereof, and a second channel inclined downwardly from the outer end of the first channel each of said channels including upper and lower laterally extending walls and a vertical back wall for engagement with upper and lower walls and a vertical wall respectively of a tool bit, the head having inwardly projecting kerfs along the back walls of both channels permitting the parts defined by the kerfs to be clamped on a bit placed in either channel, a wedge block for occupying the space in one of the channels for engaging the bit in the other channel, a cap screw extending vertically through the parts of the head for clamping them upon the bit and wedge block in the channels, one portion of head adjacent to said channels having a lateral bore therethrough, and a screw extending through said lateral bore having a head on the channeled side for engaging the outer vertical side of the bit in either channel for holding the same in engagement with the vertical back wall of the selected channel.

6. A tool holder including a longitudinal shank to be held in a lathe tool post or the like with a head portion from which a cutting bit is arranged to project, said head having a longitudinal bit holding channel in one side thereof, and a second channel inclined downwardly from the outer end of the first channel, the head having inwardly projecting kerfs along both channels permitting the parts defined by the kerfs to be clamped on a bit placed in either channel, a wedge block for occupying the space in one of the channels for engaging the bit in the other channel, laterally movable stops in both channels for engaging the inner end of the wedge block for positioning the block in either channel with its outer end in engagement with the bit in the other channel, a cap screw for clamping said parts upon the bit and wedge block in the channels, one portion of head adjacent to said kerfs having a lateral bore therethrough, and a screw extending through said lateral bore having a head on the channeled side for engaging the outer vertical side of the bit in either channel.

7. A tool holder including a longitudinal shank to be held in a lathe tool post or the like with a head portion from which a cutting bit is arranged to project, said head having a longitudinal bit holding channel in one side thereof, and a second channel inclined downwardly from the outer end of the first channel, the head having inwardly projecting kerfs along both channels permitting the parts defined by the kerfs to be clamped on a bit placed in either channel, a wedge block for occupying the space in one of the channels for engaging a bit in the other channel, laterally movable stops in both channels for engaging the inner end of the wedge block for positioning the block in either channel with its outer end in engagement with the bit in the other channel, and a cap screw for clamping said parts upon the bit and wedge block in the channels.

8. A tool holder including a longitudinal shank to be held in a lathe tool post or the like, an arched spring head extending from said shank from the outer portion of which a cutting bit is arranged to project, said head having a longitudinal bit holding channel in one side thereof, the head having an inwardly projecting kerf along the channel permitting the parts defined by the kerf to be clamped on a bit placed in the channel, a cap screw for clamping said parts upon the bit, one portion of the head adjacent to said kerf having a lateral bore therethrough, and a screw extending through said lateral bore having a head on the channeled side for engaging a vertical side of the bit in the channel.

9. A tool holder including a longitudinal shank to be held in a lathe tool post or the like, an arched spring head extending from said shank from the outer portion of which a cutting bit is arranged to project, said head having a longitudinal bit holding channel in one side thereof, the head having an inwardly projecting kerf along the channel permitting the parts defined by the kerf to be clamped on a bit placed in the channel, a cap screw for clamping said parts upon the bit, said arched head having a longitudinal channel through the lower portion thereof, and a guide bar secured in said channel in one of the arched portions of the head and extending into the channel in the other portion thereof to prevent lateral movement of the front spring portion with respect to the rear portion of the head extending from the shank of the tool holder.

10. A tool holder including a longitudinal shank to be held in a lathe tool post or the like, an arched spring head extending from said shank from the outer portion of which a cutting bit is arranged to project, said head having a longitudinal bit holding channel in one side thereof, the head having an inwardly projecting kerf along the channel permitting the parts defined by the kerf to be clamped on a bit placed in the channel, a cap screw for clamping said parts upon the bit, one portion of said arched spring head having a longitudinally extending threaded aperture therethrough, an adjusting screw in said aperture with its inner end projecting toward the other portion of the head so that the spring movement of the outer bit carrying portion of the head toward the inner portion carried by the shank may be limited, and a nut on said screw for engaging the head portion and locking the screw in its adjusted position.

11. A tool holder including a longitudinal shank to be held in a lathe tool post or the like, an arched spring head extending from said shank from the outer portion of which a cutting bit is arranged to project, said head having a longitudinal bit holding channel, means for clamping a bit in the channel so as to project forwardly of the outer spring portion of the head, said arched head having a longitudinal channel through the lower portions thereof, and a guide bar secured in said channel in one of the arched portions of the head and extending into the channel in the other portion thereof to prevent lateral movement of the front spring portion with respect to the rear portion of the head extending from the shank of the tool holder.

12. A tool holder including a longitudinal shank to be held in a lathe tool post or the like, an arched spring head extending from said shank from the outer portion of which a cutting bit is arranged to project, said head having a longitudinal bit holding channel, means for clamping a bit in the channel so as to project forwardly of outer spring portion of the head, one portion of said arched spring head having a longitudinally extending threaded aperture therethrough, an adjusting screw in said aperture with its inner end projecting toward the outer portion of the head so that the spring movement of the outer bit carrying portion of the head toward the inner portion carried by the shank may be limited, and a nut on said screw for engaging the head portion and locking the screw in its adjusted position.

13. A tool holder including a longitudinal shank to be held in a lathe tool post or the like, an arched spring head extending from said shank from the outer portion of which a cutting bit is arranged to project, said head having a longitudinal bit holding channel, means for clamping a bit in the channel so as to project forwardly of the outer spring portion of the head, the rear portion having an axial bore therethrough providing a bearing member, the forward end of the tool holder shank having a cylindrical portion adjacent to its front end, a journal projecting therefrom upon which said bearing member of the head is swively mounted, the forward end of said journal having screw threads, and a lock nut on said threaded end of the journal for engaging the outer side of the bearing member of the inner portion of the head for maintaining the head and shank members of the tool holder assembled.

14. A tool holder including a longitudinal shank to be held in a lathe tool post or the like, an arched spring head extending from said shank from the outer portion of which a cutting bit is arranged to project, said head having a longitudinal bit holding channel, means for clamping a bit in the channel so as to project forwardly of the outer spring portion of the head, the rear portion having an axial bore therethrough providing a bearing member, the forward end of the tool holder shank having a cylindrical portion adjacent to its front end, a journal projecting therefrom upon which said bearing member of the head is swively mounted with its forward end provided with screw threads, a lock nut on said threaded end of the journal for engaging the outer side of the bearing member of the inner portion of the head for maintaining the head and shank member of the tool holder assembled, said journal member provided with a flat portion within the bearing, a set screw projecting through the bearing in a position to engage said flat portion for holding the head in a vertical position on the shank, and one or more set screws extending through the bearing in other positions for engaging the journal for holding the head in any desired angular position on the shank journal.

15. A tool holder including a longitudinal shank to be held in a lathe tool post or the like, an arched spring head extending from said shank from the outer portion of which a cutting bit is arranged to project, said head having a longitudinal bit holding channel, means for clamping a bit in the channel so as to project forwardly of the outer spring portion of the head, the rear portion having an axial bore therethrough providing a bearing member, the forward end of the tool holder shank having a cylindrical portion adjacent to its front end, a journal projecting therefrom upon which said bearing member of the head is swively mounted with its forward end provided with screw threads, a lock nut on said threaded end of the journal for engaging the outer side of the bearing member of the inner portion of the head for maintaining the head and shank members of the tool holder assembled, said journal member provided with a flat portion within the bearing, a set screw projecting through the bearing in a position to engage said flat portion for holding the head in a vertical position on the shank, one or more set screws extending through the bearing in other positions for engaging the journal for holding the head in any desired angular position on the shank journal, and said head cylindrical portion of the shank having cooperating index and scale graduations whereby the angularity of the head with respect to the shank may be set with precision.

16. A tool holder including a longitudinal shank to be held in a tool post or the like, said shank having a head portion at its forward end with a longitudinal bit holding channel in one side thereof, and a kerf extending longitudinally of the channel permitting the parts separated by the kerf to be clamped on a bit placed in the channel, a cap screw extending vertically through the parts of the head defined by the kerf and adjacent to the channel for clamping the same upon the bit, and additional screw clamping means in the head portion of the holder for engaging the bit and cooperating with said cap screw for gripping the bit whereby the bit is so firmly and solidly clamped in the holder that it is substantially an integral part of the holder so that the hardness of the bit may be increased to the highest degree and the clamping effect of the holder will not break the bit.

17. A tool holder including a longitudinal shank to be held in a tool post or the like, said shank having a head portion at its forward end with a longitudinal bit holding channel therein including upper and lower laterally extending walls and a vertical back wall for engagement with upper and lower walls and a vertical wall respectively of a tool bit or bit adapter, said head portion having a kerf therein along the vertical back wall of the channel, a clamping bolt extending substantially vertically through said head portions defined by the kerf and adjacent to the back wall of the channel for clamping said head portions upon a bit or bit adapter, one or more set screws extending vertically through the upper portion of the head into the channel for engaging the upper surface of the bit and cooperating with said clamping bolt for gripping the bit whereby the bit is so firmly and solidly clamped in the holder that it is substantially an integral part of the holder so that the hardness of the bit may be increased to the highest degree and the clamping effect of the holder will not break the bit, and a horizontal clamping bolt extending through the head portion adjacent to one of the lateral walls of the channel and having a head thereon projecting over the channel for engagement with the bit or bit adapter in the channel for holding the same in engagement with the vertical back wall of the channel.

WILLIAM C. KEEBLER.

REFERENCES CITED

The following references are of record in the file of this patent:

UNITED STATES PATENTS

| Number | Name | Date |
|---|---|---|
| 854,669 | Reidy | May 21, 1907 |
| 1,045,512 | Carr | Nov. 26, 1912 |
| 1,097,818 | Packewitz | May 26, 1914 |
| 1,855,971 | Kilmer | Apr. 26, 1932 |
| 2,341,659 | Schillberg | Feb. 15, 1944 |

FOREIGN PATENTS

| Number | Country | Date |
|---|---|---|
| 515,270 | France | Nov. 24, 1920 |